United States Statutory Invention Registration [19]

Goodwin

[11] Reg. Number: H361

[43] Published: Nov. 3, 1987

[54] METALLOGRAPHIC PREPARATION OF PRESSED AND SINTERED POWDER METALLURGY MATERIAL (TUNGSTEN, COLUMBIUM, LEAD AND COPPER)

[75] Inventor: Eugene L. Goodwin, Huntsville, Ala.

[73] Assignee: The United States of America as represented by the Secretary of the Army, Washington, D.C.

[21] Appl. No.: 29,127

[22] Filed: Mar. 23, 1987

[51] Int. Cl.[4] ..... B24B 1/00

[52] U.S. Cl. ..... 51/326

[56] References Cited

PUBLICATIONS

AB Metal Digest (Buehler Ltd) 1973.

*Primary Examiner*—John F. Terapane
*Assistant Examiner*—Eric Jorgensen
*Attorney, Agent, or Firm*—John C. Garvin, Jr.; Freddie M. Bush

[57] ABSTRACT

A metallographic preparation technique employs a grinding and polishing in four stages, and with multiple steps of each stage, to produce a flat, scratch-free representative sample of a pressed and sintered powder metallurgy material comprised of tungsten, lead, copper, and columbium.

The constituents, both hard and soft and in a predetermined weight percent range, are the hard constituents of tungsten and columbium and the soft constituents of lead and copper are finished to yield a sample suitable for microscopic and photomicrograph evaluations since the flatness of the sample and scratch-free surface permits viewing of the shape and size of the individual constituents. The standard prior art metallographic preparation procedure did not produce acceptable results because of the polishing procedure which rounded the refractory constituents and left them in relief. The soft constituents were not scratch free.

2 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METALLOGRAPHIC PREPARATION OF PRESSED AND SINTERED POWDER METALLURGY MATERIAL (TUNGSTEN, COLUMBIUM, LEAD AND COPPER)

DEDICATORY CLAUSE

The invention described herein may be manufactured, used, and licensed by or for the Government for governmental purposes without the payment to me of any royalties thereon.

BACKGROUND OF THE INVENTION

The standard metallographic preparation procedure for hard materials or soft materials does not produce satisfactory results for a composite material comprised of hard or refractory materials and soft materials. The standard polishing procedure when performed on a composite material using 0.3 micron alumina and 0.05 micron alumina on a microcloth on a polishing wheel rounded the refractory constituents and left them in relief, and the soft constituents were not scratch free. Thus, for microscopic examination and evaluation, a flat, scratch-free representative sample is required.

An object of this invention is to provide a metallographic preparation procedure for obtaining a flat and scratch free surface of a representative sample of a pressed and sintered powder metallurgy material.

A further object of this invention is to provide a metallographic preparation procedure for obtaining a flat and scratch free surface of a representative sample of a pressed and sintered powder metallurgy material comprised of a composite of the refractory metals tungsten and columbium and the soft metals lead and copper.

SUMMARY OF THE INVENTION

The metallographic preparation technique comprises the use of four stages, and multiple steps of each stage, consisting of rough grinding, fine grinding, rough polishing, and final polishing to prepare a flat and scratch free surface of a pressed and sintered powder metallurgy parent material for microscopic examination and evaluation.

Representative samples for metallographic preparation are provided from pressed and sintered powder metallurgy composites having the composition shown in Table I.

TABLE I

| | Powder Metallurgy Material and Composition by Weight Percent | | | |
|---|---|---|---|---|
| Part | Tungsten | Lead | Copper | Columbium |
| A | 62.8 | 11.6 | 25.6 | 0 |
| B | 84 | 6 | 10 | 0 |
| C | 42.8 | 20.6 | 36.6 | 0 |
| D | 15 | 0 | 85 | 0 |
| E | 70 | 8 | 12 | 10 |
| F | 48 | 8 | 29 | 15 |
| G | 57 | 0 | 33 | 10 |

The representative samples of Table I contain hard and soft constituents. The hard constituents are refractory metals of tungsten and columbium, and the soft constituents are soft metals of copper and lead. All samples were selected and cut from parent material and encapsulated in epoxy resin prior to polishing, Stage A. The encapsulation enabled the sample to be held during grinding and polishing for the metallographic preparation technique disclosed by the additional Stages B–E and steps outlined below.

The four additional stage procedures B–E are:

Stage B, rough grinding, is accomplished on a belt surfacer using a 120 grit silicon carbide belt with water and a soluble oil as a lubricant.

Stage C, fine grinding, is accomplished in four steps using from 240 grit silicon carbide in step 1 to 320 grit to 400 grit and 600 grit in steps 2,3, and 4 respectively using water lubricant.

Stage D, rough polishing employees a three step procedure which uses 7 micron, 3 micron, and 1 micron diamond bort paste respectively with cleaning between steps with liquid detergent and running water.

Stage E, final polishing, is accomplished by a two step procedure using on a flat bronze wheel covered with a microcloth impregnated with a water slurry of 0.3 micron alumina powder. Sample is cleaned with liquid detergent and running water, and after final polishing step using 0.05 micron alumina powder and liquid detergent, sample is washed with liquid detergent, rinsed with alcohol and dried by hot air from heat gun. The sample is ready for microscopic examination.

DESCRIPTION OF THE PREFERRED EMBODIMENTS

The metallographic preparation procedure for pressed and sintered powder metallurgy material samples comprises completing the four stage and multiple steps procedure defined below.

The powder metallurgy material and composition by weight for prepared samples for polishing are shown under Example I below.

| Part | Tungsten | Lead | Copper | Columbium |
|---|---|---|---|---|
| A | 62.8 | 11.6 | 25.6 | 0 |
| B | 84 | 6 | 10 | 0 |
| C | 42.8 | 20.6 | 36.6 | 0 |
| D | 15 | 0 | 85 | 0 |
| E | 70 | 8 | 12 | 10 |
| F | 48 | 8 | 29 | 15 |
| G | 57 | 0 | 33 | 10 |

The parent materials contain hard and soft constituents. The hard constituents are refractory metals (tungsten and columbium), and the soft constituents are copper and lead.

The samples are selected, cut from the parent material, and encapsulated in epoxy resin prior to polishing, Stage A.

The metallographic preparation technique is divided into four (4) additional stages B–E as follows:

B. Rough Grinding
C. Fine Grinding
D. Rough Polishing
E. Final Polishing

Stage B—Rough Grinding.

Samples are rough ground on a belt surfacer using a 120 grit silicon carbide belt with water and a soluble oil as a lubricant. The purpose of this stage is to remove most of the disturbed metal resulting from the cutting operation, and to obtain a flat surface prior to the fine grinding stage. Samples are cleaned in running water after rough grinding.

Stage C—Fine Grinding.

Fine grinding is accomplished in four steps with a pregrinder and lubricants as described:

| Grit Paper | Lubricant |
|---|---|
| Step 1 - 240 grit silicon carbide | Water |
| Step 2 - 320 grit silicon carbide | Water |
| Step 3 - 400 grit silicon carbide | Water |
| Step 4 - 600 grit silicon carbide | Water |

The purpose of this stage is to obtain the best possible surface that is scratch-free, flat and relatively free of disturbed metal. Samples are cleaned after each grinding step with running water before proceeding to the next finer grit.

The polishing operation is accomplished by lapping the face of the sample on a flat wheel which is cloth-covered and impregnated with the proper polishing media. The wheels are lubricated with a compatible fluid.

Stage D—Rough Polishing.

Step 1. Rough polishing is accomplished on a flat bronze wheel covered with a woven nylon polishing cloth charged with seven (7) micron diamond bort paste. Lapping oil is used as a lubricant. Medium to heavy pressure is applied for approximately 30 seconds at a wheel speed of approximately 350–400 RPM. Sample is cleaned with liquid detergent and running water.

Step 2. Polishing is accomplished on a flat bronze wheel covered with a woven nylon polishing cloth charged with three (3) micron diamond bort paste. Lapping oil is again used as a lubricant. Medium to heavy pressure is applied for approximately 30 seconds at a wheel speed of 350–400 RPM. Sample is cleaned with liquid detergent and running water.

Step 3. Polishing is accomplished on a flat bronze wheel covered with a woven nylon polishing cloth charged with one micron diamond bort paste. Lapping oil is again used as a lubricant. Medium pressure is applied for approximately 30 seconds at a wheel speed of 350–400 RPM. Sample is cleaned with liquid detergent and running water.

Stage E—Final Polishing.

Step 1. Polishing is accomplished on a flat bronze wheel covered with a microcloth impregnated with a water slurry of 0.3 micron alumina powder and a laboratory liquid detergent. Medium pressure is applied for approximately 15 seconds at a wheel speed of 600–700 RPM. Sample is cleaned with liquid detergent and running water.

Step 2. The last step in the final polishing stage is accomplished by using a flat bronze wheel covered with a microcloth impregnated with a water slurry of 0.05 micron alumina powder and a liquid detergent. Light to medium pressure is applied for approximately 15–20 seconds at a wheel speed of 600–700 RPM. The sample is washed in warm running water, rinsed with alcohol and dried by hot air from a heat gun. The sample is ready for microscopic examination.

A microscopic examination and evaluation of the samples polished by the above procedure steps revealed the flatness and the shape and size of individual constituents. It is concluded from reviewing the photomicrograph at 200× magnification in the as-polished condition that the metallographic preparation procedure of this invention has overcome the problems observed for samples polished by the prior art procedure which routinely resulted in variations between hard and soft material surfaces of causing rounding for the refractory constituents and leaving the surfaces in a relief state having inequalities of surface elevations and producing a non-scratch free surface for the soft constituents.

I claim:

1. A method for metallographic preparation of pressed and sintered powdered metallurgy parent material containing both hard and soft metals in a predetermined amount, said hard metals selected from the refractory metals consisting of tungsten and columbium and said soft metals selected from the soft metals consisting of copper and lead, said method comprising completing the preparation techniques set forth under stages A through E and completing processing steps defined thereunder as follows:

Stage A: providing suitable metallographic samples for microscopic examination and evaluation which comprises:

(i) providing samples cut from said parent material; and, (ii) encapsulating said samples in epoxy resin which enables said samples to be held during grinding and polishing procedures;

Stage B: completing rough grinding said samples which comprises:

(i) grinding said samples on a belt surfacer using a 120 grit silicon carbide belt with water and soluble oil as a lubricant to obtain a flat surface prior to fine grinding stage; and, (ii) cleaning said rough ground sample in running water;

Stage C completing fine grinding of said rough ground sample which comprises:

(i) fine grinding said rough ground sample using 240 grit silicon carbide paper and water lubricant so as to obtain the best possible surface that is scratch-free, flat and relatively free of disturbed metal; and, (ii) cleaning said fine ground sample with running water;

(iii) continue said fine grinding using 320 grit silicon carbide paper and water lubricant so as to obtain the best possible surface that is scratch-free, flat and relatively free of disturbed metal; and, (iv) cleaning said continued fine ground sample with running water;

(v) continue said fine grinding using 400 grit silicon carbide paper and water lubricant so as to obtain the best possible surface that is scratch-free, flat and relatively free of disturbed metal; and, (vi) cleaning said continued fine ground sample with running water;

(vii) continue and completing said fine grinding using 600 grit silicon carbide paper and water lubricant so as to obtain the best possible surface that is scratch-free, flat and relatively free of disturbed metal; and, (viii) cleaning said continued and completed fine ground sample with running water;

Stage D: completing rough polishing said fine ground samples which comprises:

(i) rough polishing said fine ground sample with a flat bronze polishing wheel covered with a woven nylon polishing cloth charged with seven micron diamond bort paste while employing laping oil as a lubricant and applying medium to heavy pressure for approximately 30 seconds at a wheel speed of 350–400 RPM; and, (ii) cleaning said rough polished sample with liquid detergent and running water;

(iii) continue said rough polishing of said rough polished samples as defined under said stage D(i) while employing a woven nylon polishing cloth charged with three micron diamond bort paste instead of said woven nylon polishing cloth charged with seven micron diamond bort paste; and, (iv) repeating said cleaning of said rough polished samples as defined under said stage D(ii);

(v) continue and completing said rough polishing of said rough polished samples as defined under said stage D(iii) while applying medium pressure and while employing a woven nylon polishing cloth charged with one micron diamond bort paste instead of said woven nylon polishing cloth charged with seven micron diamond bort paste; and, (vi) repeating said cleaning of said rough polished samples as defined under said stage D(ii);

Stage E: completing final polishing said rough polished samples which comprises:

(i) polishing said rough polished samples with a flat bronze wheel covered with a microcloth impregnated with a water slurry of 0.3 micron alumina powder while employing a liquid detergent as a lubricant and while applying medium pressure for approximately 15 seconds at a wheel speed of 600–700 RPM; and (ii) cleaning said final polished sample with liquid detergent and running water;

(iii) continue said final polishing said final polished and cleaned sample with a flat bronze wheel covered with a microcloth impregnated with a water slurry of 0.05 micron alumina powder while employing a liquid detergent as a lubricant and while applying medium pressure for approximately 15–20 seconds at a wheel speed of 600–700 RPM; and, (iv) washing said final polished sample in warm running water, rinsing with alcohol, and drying by hot air from a heat gun to complete said metallographic preparation of pressed and sintered powdered metallurgy samples for microscopic examination.

2. The method defined by claim 1 wherein said predetermined amount of hard metal tungsten varies from about 15 to about 84 weight percent; said predetermined amount of hard metal columbium varies from 0 to about 15 weight percent; said predetermined amount of soft metal lead varies from about 0 to about 20.6 weight percent; and said predetermined amount of soft metal copper varies from about 10 to about 85 weight percent.

* * * * *